United States Patent [19]
Knowles et al.

[11] 3,817,660
[45] June 18, 1974

[54] AIR CONDITIONER COMPRESSOR

[75] Inventors: James Knowles, Bloomfield Hills; Thomas R. Stockton, Ann Arbor, both of Mich.

[73] Assignee: Ford Motor Company, Dearborn, Mich.

[22] Filed: June 25, 1971

[21] Appl. No.: 156,674

[52] U.S. Cl. .............................. 417/269, 417/319
[51] Int. Cl. ....................... F04b 1/12, F04b 35/02
[58] Field of Search ...... 91/502, 499; 417/223, 319, 417/269; 192/85 AA; 74/569

[56] References Cited
UNITED STATES PATENTS

| | | | |
|---|---|---|---|
| 991,699 | 5/1911 | Cassady | 91/502 |
| 1,860,278 | 5/1932 | Eckels | 417/269 |
| 3,142,369 | 7/1964 | Atkins | 192/3.24 |
| 3,266,715 | 8/1966 | Hass et al. | 417/223 |
| 3,278,110 | 10/1966 | Heidorn | 417/319 |
| 3,612,237 | 10/1971 | Honda | 192/85 AA |
| R15,756 | 2/1924 | Michell | 91/502 |

*Primary Examiner*—William L. Freeh
*Assistant Examiner*—G. P. LaPointe
*Attorney, Agent, or Firm*—Donald J. Harrington; Keith L. Zerschling

[57] ABSTRACT

A compressor for pressurizing refrigerants in an air conditioner system comprising double-acting pistons mounted for reciprocation in a common cylinder housing in angularly-spaced disposition with respect to a driving torque input shaft, a swash plate assembly connecting drivably said torque input shaft and the pistons whereby rotary motion of the shaft is translated into reciprocating motion of the pistons as radial loads on the assembly are transferred to the assembly, a fluid pressure operated clutch for connecting a disc pulley to the torque input shaft, a positive displacement pump driven by the torque input shaft and a valve for distributing pressure from the pump to the clutch.

2 Claims, 12 Drawing Figures

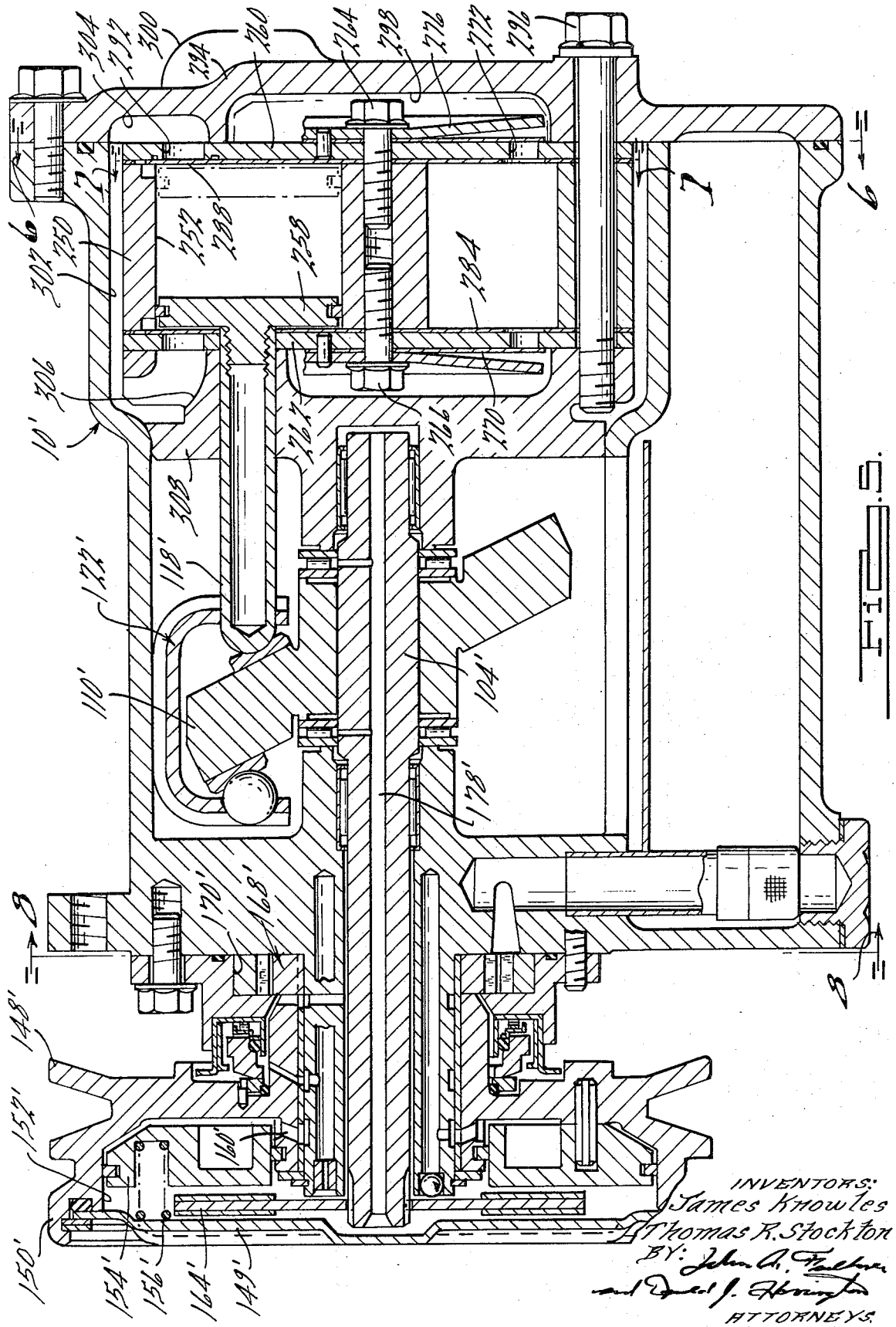

INVENTORS:
James Knowles
Thomas R. Stockton
BY:
ATTORNEYS.

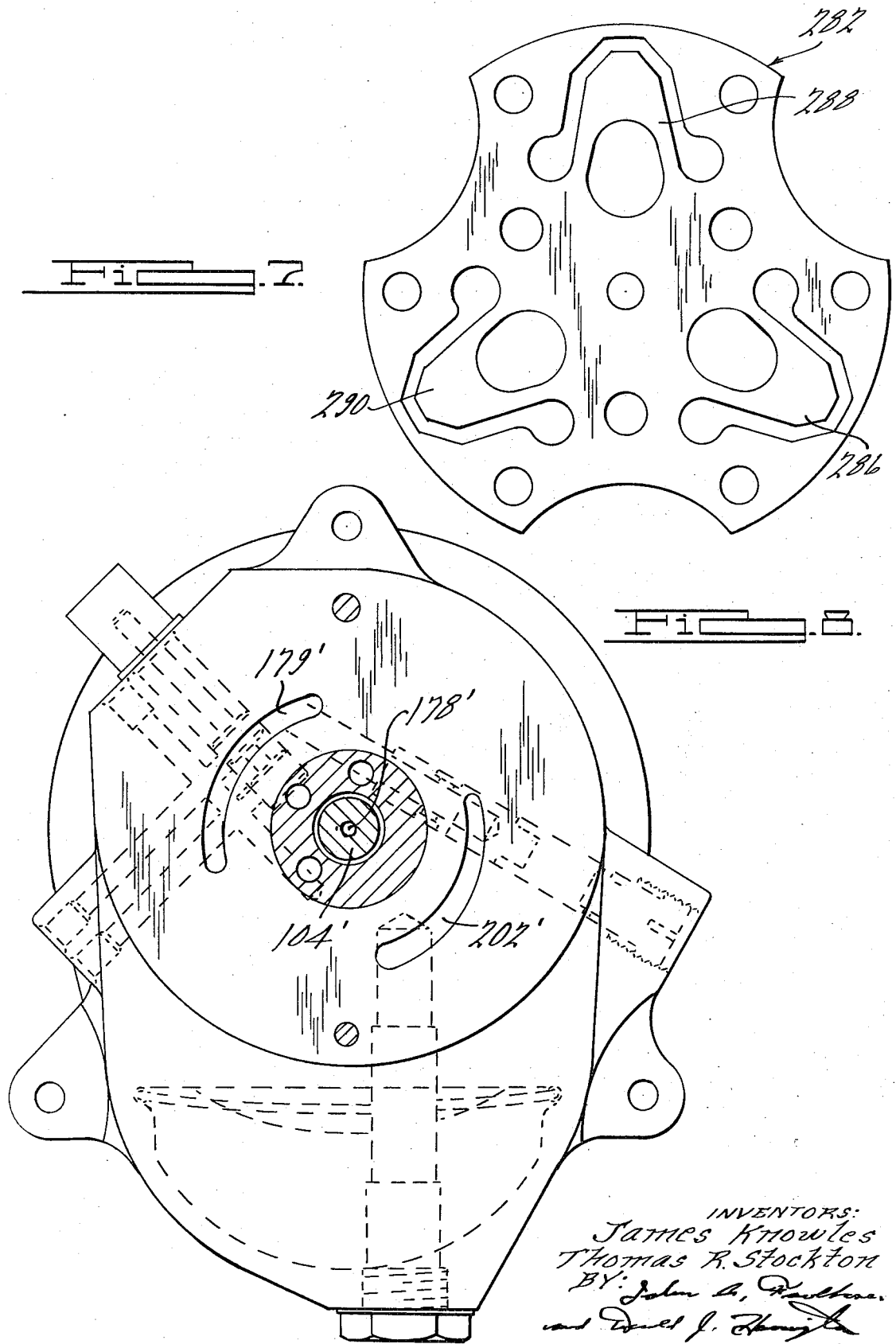

AIR CONDITIONER COMPRESSOR

GENERAL DESCRIPTION OF THE INVENTION

Our invention relates generally to improvements in compressors for fluids, such as Freon in an air conditioning system. Our improved compressor is adapted to be driven by a drive pulley drivably coupled to the crankshaft of an internal combustion engine in an automotive vehicle driveline. The discharge side of the compressor is in fluid communication with an evaporator and a condenser in series relationship.

We are aware of prior art compressors for use in automotive vehicle air conditioning systems. These include swash plate compressors which comprise a cylinder body having two sets of cylinders arranged in angularly spaced relationship about the axis of a centrally disposed driveshaft. The cylinders of one set are arranged in aligned juxtaposition with respect to the cylinders of the other set. A separate piston is mounted for reciprocation in each cylinder of each set. The pistons of the oppositely disposed corresponding cylinders are joined together to form an integral piston assembly. As the piston assembly is actuated in one direction, one of the associated cylinders has its working chamber pressurized and the working chamber of the opposite cylinder is exhausted. The converse is true as the piston assembly is moved in the opposite direction.

The driveshaft of such prior art compressors carries a swash plate assembly. The margin of the swash plate is received within radially extending recesses formed in each piston assembly. Bearings are carried by the piston assemblies and they are adapted to engage slidably the surfaces of the swash plate as the latter is driven by the driveshaft. This imparts reciprocating motion to the pistons as the shaft is rotated.

An example of a construction of this type may be seen by referring to U.S. Pat. No. 3,057,545. Other similar compressor constructions are shown in U.S. Pat. Nos. 3,215,341; 3,352,485 and 3,380,651.

Each cylinder and its cooperating piston in these known swash plate compressors form a single acting pump. Cylinder heads for the pumps are located on each axial end of the assembly. Duplicate inlet and outlet valving is required for each of the cylinders.

It is an object of our invention to provide a simplified, compact, swash-plate compressor assembly for use in an automotive air conditioning system which avoids duplication of parts found in prior art designs such as those shown in the reference patents identified above. We have embodied in our design a swash plate actuator that is adapted to convert rotary motion of a driveshaft into reciprocating motion of the compressor pistons. Provision is made in our improved design, however, for transferring radial force components of the forces transferred through the piston rods by the swash plate surfaces to the surrounding stationary compressor housing, thereby avoiding misalignment of the piston rods.

A lubrication pump is connected drivably to a drive pulley journalled rotatably on a stationary sleeve shaft extending from the compressor housing. A fluid pressure operated friction clutch supported on the housing is adapted to connect selectively the driveshaft to the drive pulley. The source of pressure for the clutch is the lubrication pump. Conduit structure connecting the pump discharge side with the fluid clutch actuator is controlled by a driver-controlled valve assembly.

The fluid pressure operated clutch assembly of our invention is distinguished from conventional electromagnetic clutch assemblies in environments of this type. Many of these clutch assemblies require stator windings that are adapted to rotate with a conventional drive pulley and an armature carried by the driveshaft. In others the stator windings remain stationary. A switching circuit, which may include a thermostatically operated actuating switch, is located between a voltage source and the windings of the electromagnetic clutch stator.

BRIEF DESCRIPTION OF THE FIGURES OF THE DRAWING

FIG. 6 is a cross-sectional view taken along the plane of section line 6—6 of FIG. 5.

FIG. 7 is a cross-sectional view taken along the plane of section line 7—7 of FIG. 5.

FIG. 8 is a cross-sectional view taken along the plane of section line 8—8 of FIG. 5.

PARTICULAR DESCRIPTION OF THE INVENTION

Figure 1:
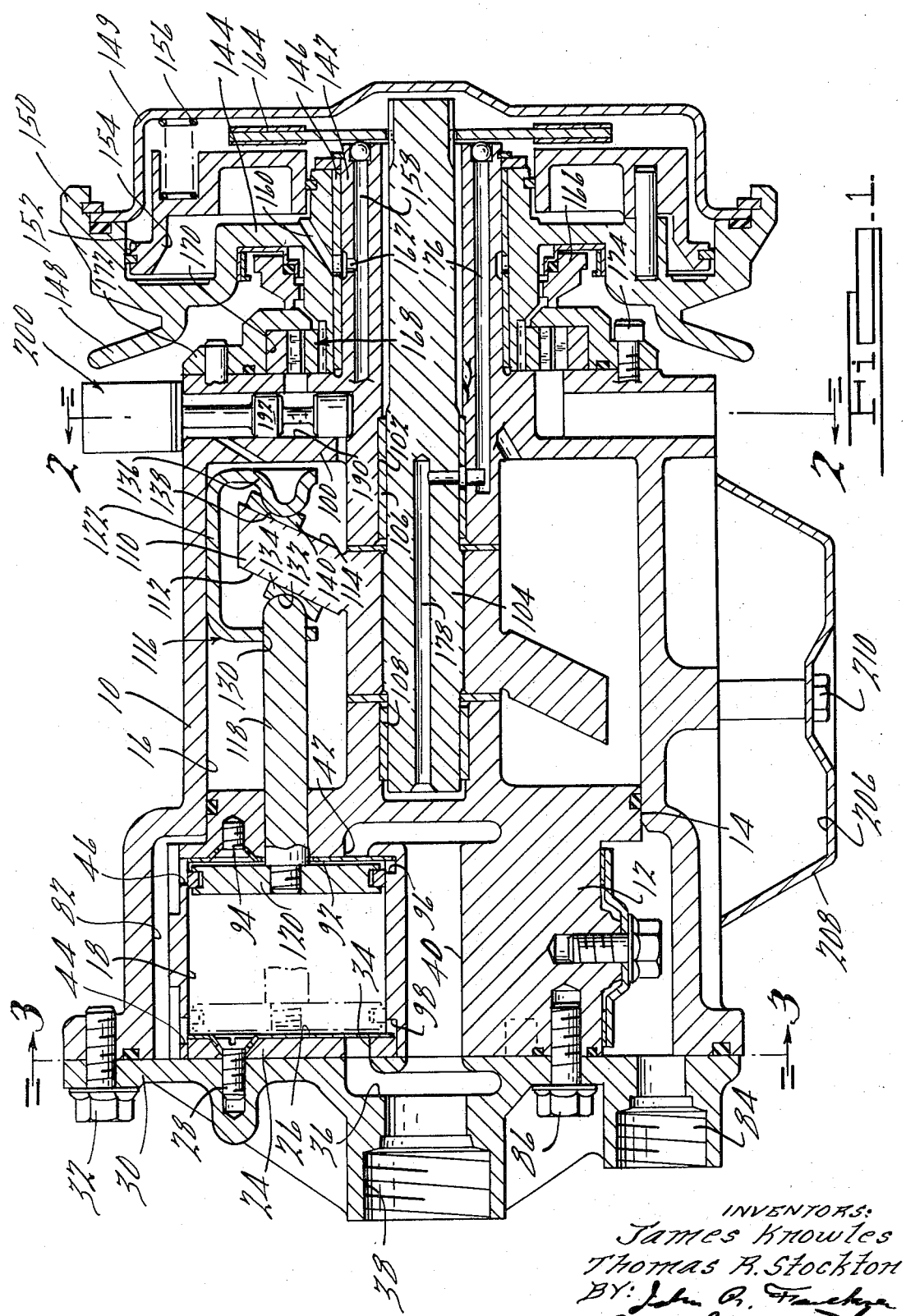
FIG. 1 shows in longitudinal cross-sectional form a compressor assembly embodying the improvements of our invention.
Figure 3:
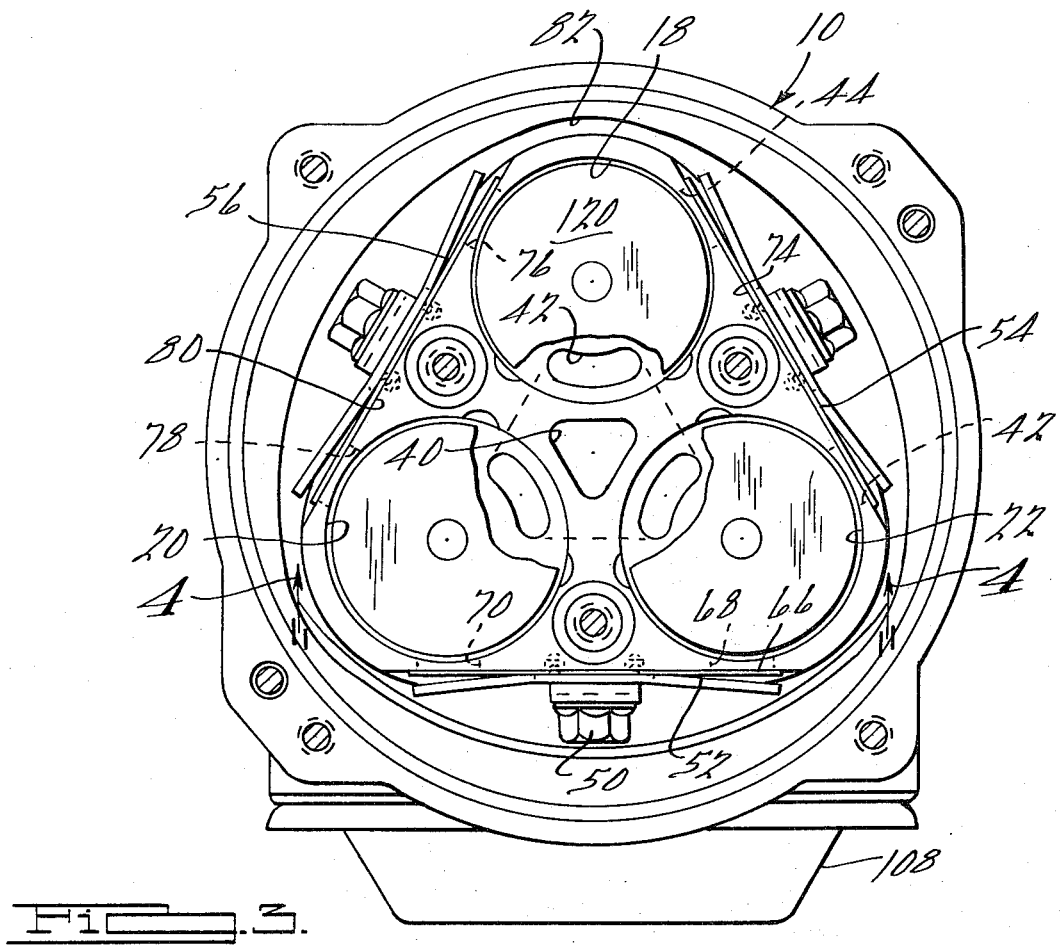
FIG. 3 is a cross-sectional view of the porting found in the assembly of FIG. 1. It is taken along the plane of section line 3—3 of FIG. 1.

Numeral 10 designates in FIG. 1 a relatively stationary compressor housing. The left-hand end of the housing 10 is open and is adapted to receive cylinder body 12. A circular shoulder 14 is received slidably within the cylindrical portion 16 of the housing 10. Cylinder body 12 is provided with three axially extending cylindrical openings 18, 20 and 22 which are spaced 120° out of position with respect to each other, as indicated in FIG. 3. A circular valve plate 24 is positioned within the left-hand end of each of the openings 18, 20 and 22 and an inlet valve reed 26 is secured by screws 28 to the valve plate 24. The screws are threadably received within openings formed in the end wall 30, which is secured to the housing 10 by bolts 32.

Plate 24 is formed with valve openings 34 which are adapted to be closed by the associated valve reeds 26. Each port 34 is in communication with cored inlet passage 36 in the cover 30. This passage in turn communicates with inlet port 38. It communicates also with a central passage 40 formed in the cylinder body 12. A corresponding port 42 is formed in the opposite end of each of the openings, one of which is shown in FIG. 1 in the opening 18. Ports 42 communicate with the passage 40, as shown in FIG. 1. Each cylindrical opening also has a pair of outlet ports, as shown at 44 and 46 in FIG. 1. These are located adjacent each axial end of the cylindrical opening.

The cylinder body 12 is formed with three flat surfaces spaced 120° apart. A reed valve 48 is secured by bolt 50 to surface 52, and a similar valve is secured to the other two valve surfaces 54 and 56. Reed valve 48 comprises four valve back-up plates 58, 60, 62 and 64. These are formed on an inclination with respect to the cooperating valve surface 52. Situated between the surface 52 and the plates 58 through 64 is a reed valve 66 which is adapted to open and close outlet valve ports 68 and 70 formed, respectively, in the cylindrical openings 22 and 20. Outlet ports 44 and 42 for the cylindrical openings 18 and 22 are covered by reed valve 74, which is secured to the surface 54 in a manner similar to the valve 48. Outlet ports 76 and 78 in the cylindrical openings 18 and 20, respectively, are controlled by reed valve 80 which is secured to the surface 56. Each of the cylindrical openings is provided with two outlet ports. Because of this double porting arrangement, it is possible to reduce the clearance volume during the pumping stroke of the compressor for any given flow capacity. If a single port were used rather than our double porting arrangement, the volume of the fluid flow path from the interior of the working chamber to the outlet reed valve would be increased, thereby reducing the volumetric efficiency of the compressor.

The collector chamber within the left-hand end of the casing 10 and surrounding the cylinder body 12 is identified by reference character 82.

This chamber is in fluid communication with outlet port 84 formed in the plate 30. Plate 30 is secured to the cylinder body 12 by bolts 86.

Figure 4:
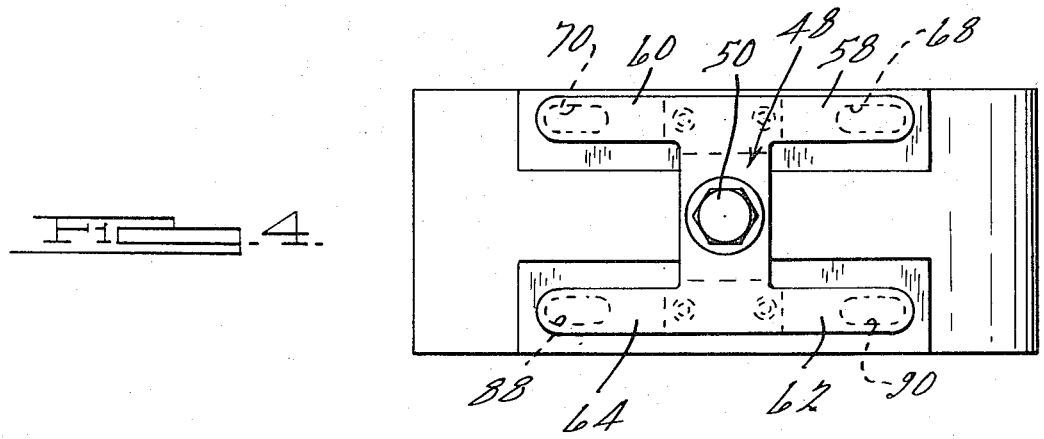
FIG. 4 is a subassembly view of the valve reeds shown in FIG. 3 as seen from the plane of section line 4—4 of FIG. 3.

Port 46 for the cylindrical opening 18 is one of two ports located in the right-hand end of the chamber 18. In a similar fashion each of the other cylindrical chambers 20 and 22 is formed with a pair of outlet ports in its right-hand end. Each of the tandem ports at the right-hand end of each of the cylindrical openings is controlled by the valve reed which forms a part of an assembly such as that illustrated in FIG. 4. The outlet ports at the right-hand end of the cylindrical chambers 20 and 22 are identified in FIG. 4 by reference characters 88 and 90. Thus there are two outlet ports at the right-hand end of each of the cylindrical openings as well as at the left-hand end. All of the outlet ports communicate with the common collector chamber 82.

Inlet port 42 for the cylindrical opening 18 is covered by a reed valve 92 which is held secure by a fastening screw 94 received in the end wall of the cylindrical opening 18. A corresponding inlet valve is provided at the right-hand end of each of the other two cylindrical openings 20 and 22.

Reed 92 registers with a groove 96 in the wall of the cylindrical opening 18. This groove serves as a mechanical stop to prevent excessive flexure of the reed valve 92. In a similar fashion, the left-hand end of the cylindrical opening 18 is provided with a recess 98 which registers with the end of reed valve 26 thereby preventing excessive flexure of that valve.

The casing 10 has an end wall 100 with a central opening 102 in which drive shaft 104 is journalled, a suitable bearing 106 being provided for this purpose.

The right hand end of the cylinder body 12 is formed with a bearing aperture 108. The left-hand end of the shaft 104 is journalled in that aperture.

A swash plate 110 is fixed to the shaft 104 and is adapted to rotate about the axis of shaft 104. It includes two bearing surfaces 112 and 114 which extend within a cross-head assembly 116. This crosshead assembly forms a driving connection between the swash plate and the piston rods, one of which is shown at 118. The rod 118 is connected directly to piston 120 which is mounted for axial displacement in the cylindrical opening 18. A corresponding piston is mounted within each of the other two cylindrical openings 20 and 22. Those pistons also are connected to the crosshead assembly through individual piston rods.

The crosshead assembly is located within a separate region of the casing 10. Swash plate 110 and shaft 104 are driven through a drive clutch which will be described subsequently.

Crosshead assembly 116 comprises three articulated bearing members 122, 124 and 126. Each of these is identical to the others. Bearing surface 128 formed on the radially outward side of the member 122 slidably engages the interior circular wall of the casing 10. The other members 124 and 126 have similar bearing surfaces. The right-hand end of piston rod 118 is received within opening 130 in one side wall of the bearing member 122. The end of piston rod 118 is crowned to form a spherical bearing 132. This registers with bearing shoe 134 which slides on the surface 112 of swash plate 110. The opposite wall 136 of bearing member 122 is indented to form a spherical bearing 138 which registers with bearing shoe 140, which in turn slidably engages wall 114 of the swash plate 110.

The radially inward margin of bearing member 122 slidably engages the corresponding radially inward margin of the companion bearing members 126 and 124. An axial displacement of one bearing member with respect to the other takes place as the swash plate 110 is rotated. The radially outward component of the thrust force acting on the piston rods is distributed through the bearing member 122 to the surrounding casing 10. This eliminates radial loads on the piston rods and prevents misalignment of the piston rods due to misalignment and flexure caused by transverse loads.

The bearing member 122 and the companion bearing members 124 and 126 are designed so that they transmit a permanent spring load to their respective bearing shoes thereby providing a zero tolerance bearing connection between the piston rods and the swash plate.

Casing 10 is provided with a stationary sleeve shaft support 142. Pulley 144 is journalled on the sleeve shaft 142 by means of a bushing 146. Pulley 144 is provided with a drive belt V-groove 148 which receives an engine-driven drive belt. The load on the drive belt is transmitted directly through the pulley and through the bearing 146 to the sleeve shaft 142. Drive shaft 104 extends through the sleeve shaft 142 and is isolated from the pulley loads.

An end plate 149 is connected at its periphery to the outer margin 150 of the pulley 144. Pulley 144 is provided with an annular cylinder 152 which receives an annular piston 154. Return spring 156 anchored on the plate 149 urges the piston 154 to a retraced position. Piston 154 and the cylinder 152 cooperate to define a pressure chamber which is in fluid communication with passage 158 through passage 160 and through port 162 in the sleeve shaft 142.

Clutch disc 164 is retracted between the plate 149 and the piston 154. When the working chamber behind the piston 154 is pressurized, a shaft 104 becomes frictionally connected to pulley 144 through the disc 164. The hub portion of the pulley 144 carries a fluid seal 166.

Located between the wall 100 of the casing 10 and the pulley 144 is a positive displacement lubrication pump 168. It includes a torque input gear member which is connected to the hub of the pulley 144. The companion gear member of the pump 168 rotates within pump cavity 170 formed in pump housing 172. This in turn is secured by bolts 174 to the casing 10.

Figure 2:
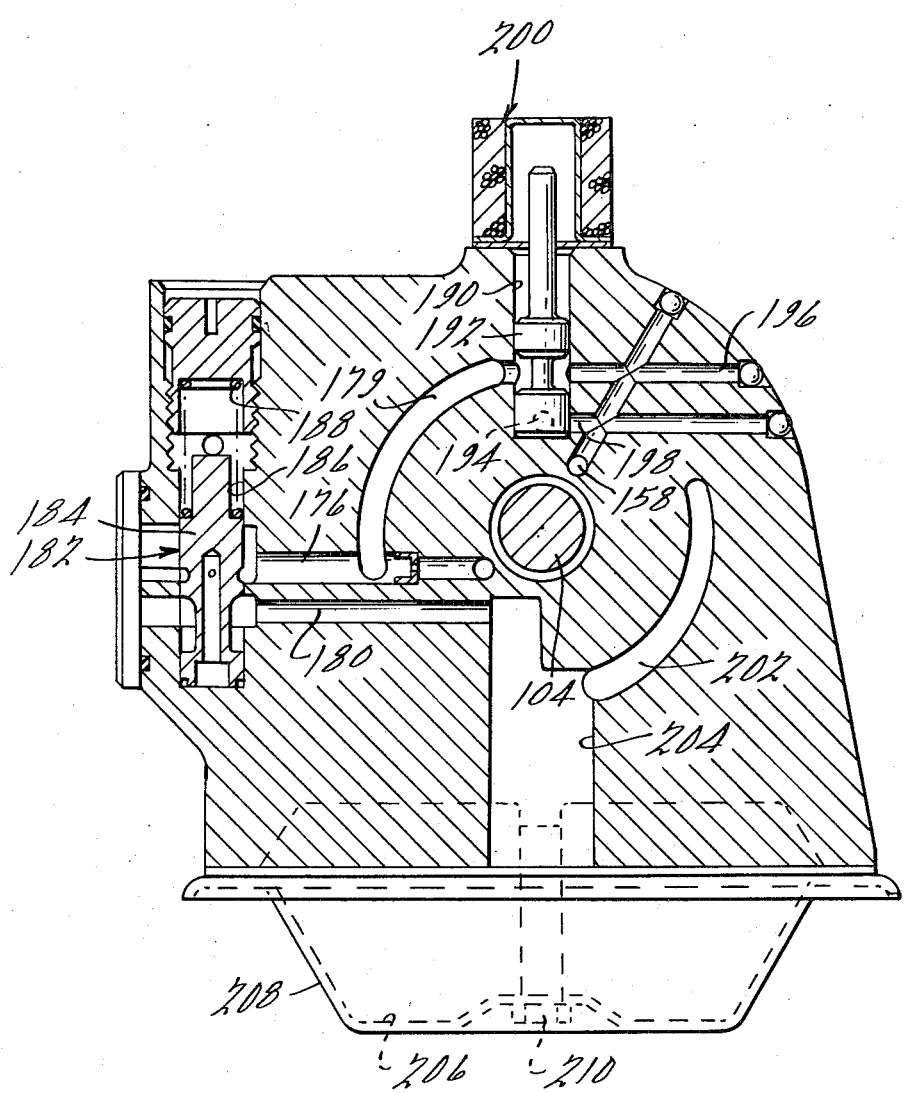
FIG. 2 is a cross-sectional view taken along the plane of section line 2—2 of FIG. 1.

Lubrication passage 176 in the sleeve shaft 142 communicates with lubrication passage 178 in the shaft 104 which is in communication with the bearings for the shaft. Passage 176 is in fluid communication with the discharge port 179 of the pump 168, as indicated in FIG. 2. Communication between passage 176 and an exhaust passage 180 is established by pressure regulator valve 182. This valve comprises a multiple land valve element 184 situated slidably within regulator valve chamber 186 formed in casing 10. Valve spring 188 acts on the valve element 184 and opposes fluid pressure forces acting on the lower end of the valve element 184. When the pressure passage 176 exceeds the calibrated value determined by the force of the spring 188, communication is established with passage 180, thereby providing a reduced pressure for the lubrication points. Discharge port 179 communicates also with valve chamber 190 in which is slidably positioned valve spool 192.

A vent port 194 communicates with the chamber 190. Port 194 is blocked by the valve spool 192 when the latter is positioned at its radially inward location. Discharge port 178 communicates through the valve chamber 190 with passage 196 when the valve spool is positioned as shown in FIG. 2. Passage 196 in turn communicates with passage 158 which extends to the working pressure chamber of the clutch. Port 194 is adapted to communicate with passage 158 through exhaust passage 198 when valve spool 192 is moved radially outward. Thus clutch application and release can be achieved by moving the valve spool 192 inwardly and outwardly. This radial movement is accomplished by a solenoid actuator shown schematically at 200 in FIG. 2.

The discharge port 202 for the pump 168 communicates with drain port 204 which in turn communicates with the interior of the transmission sump 206. The sump is defined in part by an oil pan 208 which is bolted to the lower region of the casing 10 by bolt 210. Suitable drain ports are provided allowing the fluid distributed to the bearing points in the compressor mechanism to drain back under gravity to the interior 206 of the sump.

The embodiment disclosed in FIGS. 1–4 establishes two pumping strokes for each cylinder for each revolution of the swash plate. Thus it is possible to obtain substantially the same pumping capacity with three cylinders as conventional six cylinder compressor mechanisms such as those described in the previously mentioned prior art references.

The embodiment illustrated in FIGS. 5–10 is an alternate construction having components that are similar to the components of the embodiment of FIGS. 1–4, but the valving arrangements for the double-acting cylinders is different. The components of the embodiment in FIGS. 5–10 that have counterparts in the embodiment of FIGS. 1–4 have been identified by similar reference characters although prime notations have been added.

Figure 5A:
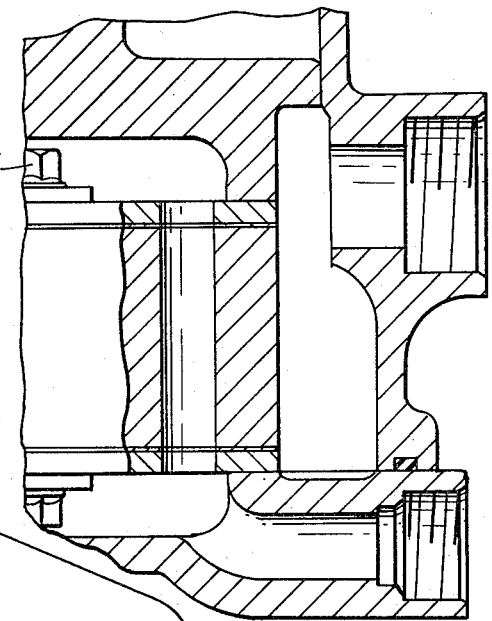
FIG. 5A is a partial cross-sectional view taken along the plane of section line 5A—5A of FIG. 6.
Figure 5:
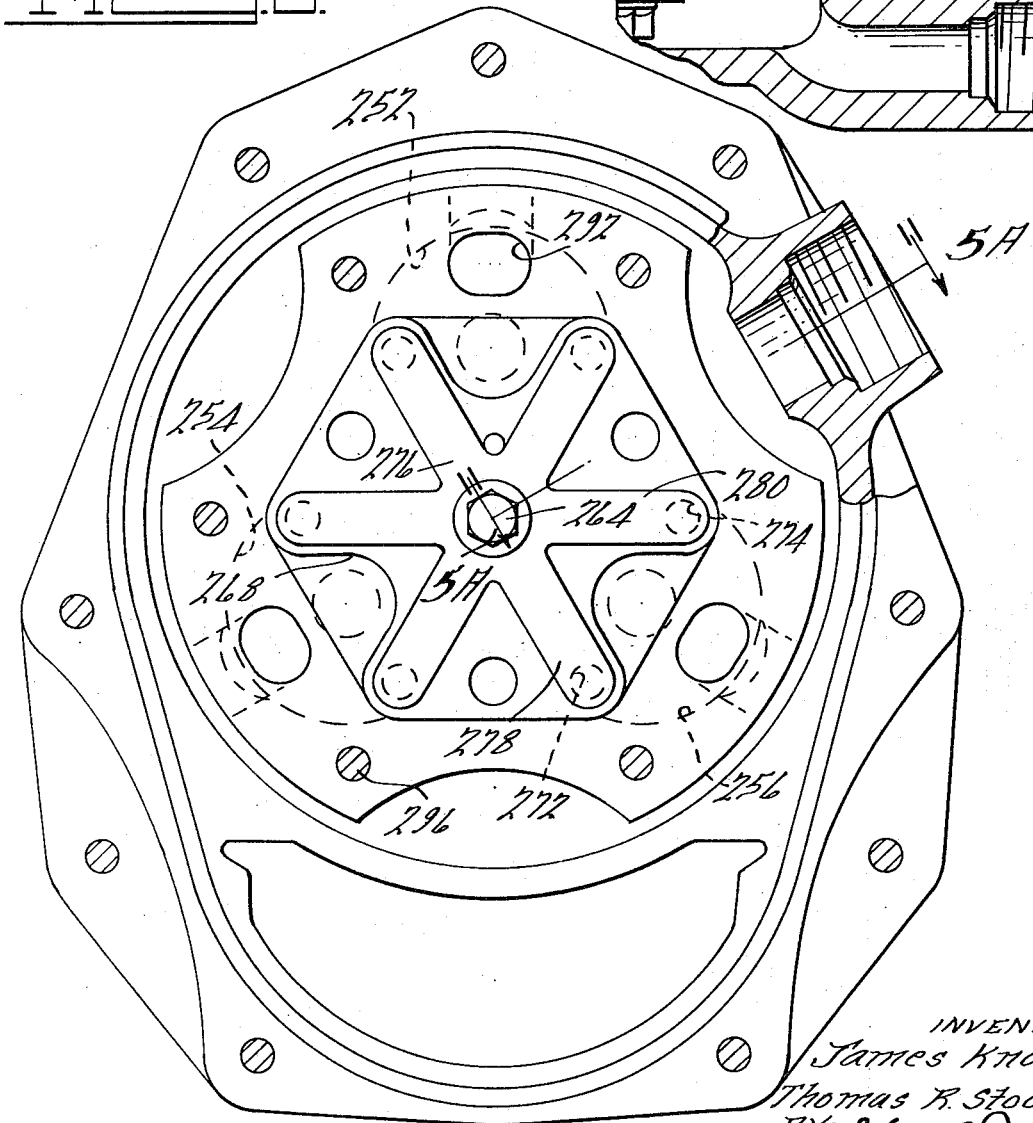
FIG. 5 is a cross-sectional view of an alternate embodiment of our invention. It corresponds to the cross-sectional view of FIG. 1.
Figures 9, 10:
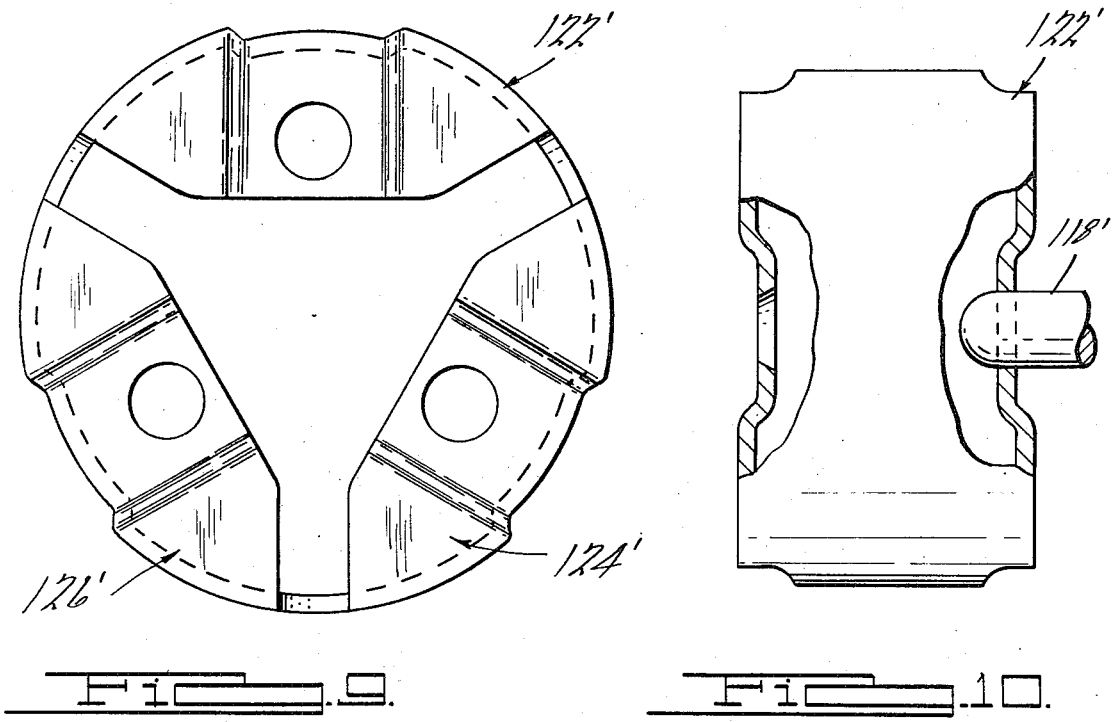
FIG. 9 is a partial assembly view showing the crosshead found in the assembly of FIG. 5.
FIG. 10 is a side view of the crosshead of FIG. 9.
Figure 11:
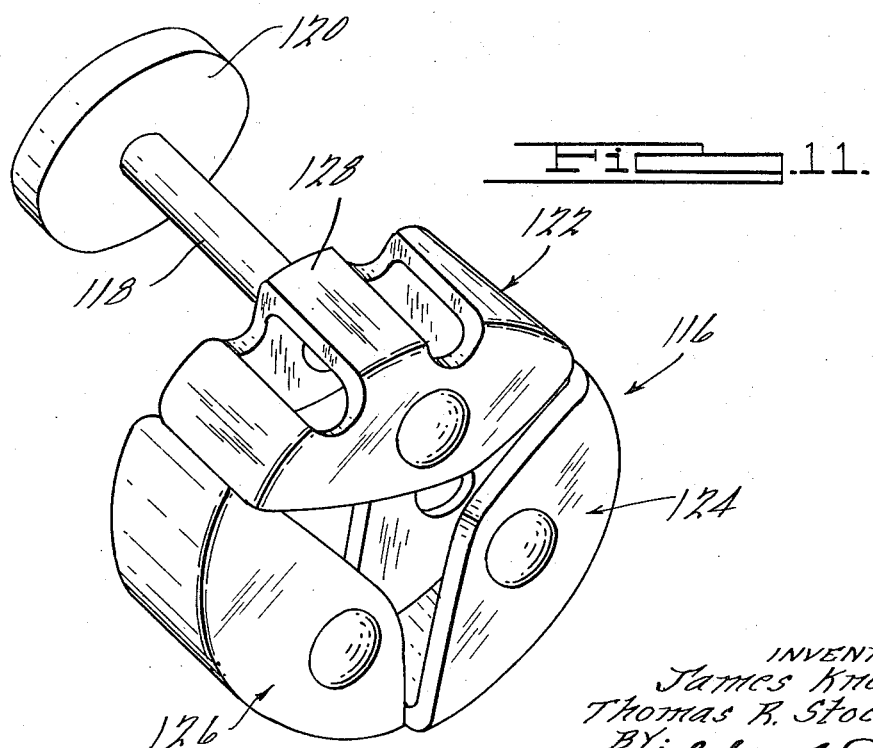
FIG. 11 shows in isometric form a crosshead assembly for use in the assembly of FIG. 1, but which is adapted to accommodate a bearing pad of the type shown in FIG. 5.

The cylinder block for the second embodiment is shown in FIG. 5 at 250. It includes three angularly disposed double-acting cylinders 252, 254 and 256. Each cylinder receives a piston. The piston for cylinder 252 is shown at 258. The right-hand end of the cylinders 252, 254 and 256 is closed by valve plate 260. A corresponding valve plate 262 closes the opposite end of the cylinders. The valve plates are secured to the cylinder body 250 by bolts 264 and 266. An outlet valve reed 268 is located directly adjacent the right-hand side of valve plate 260 and a corresponding outlet valve reed 270 is located directly adjacent the valve plate 262. The valve reeds are adapted to cover outlet ports 272 and 274 for the cylinder 256 and the corresponding pairs of ports for the other two cylinders. A valve reed back-up plate 276 includes arms extending radially to each valve port. The arms extending to ports 272 and 274 are shown at 278 and 280, respectively.

An inlet valve reed 282 is located on the inboard side of the valve plate 260. A corresponding reed 284 is located at the opposite end of the cylinder body on the inward side of the valve plate 262.

Valve reed 282 includes three inlet valve portions 286, 288 and 290. These cooperate with the inlet ports in the valve plate 260. The inlet port for the cylinder 252 is identified by reference character 292. It registers with valve portion 288. Corresponding inlet ports provided in the opposite end of the cylinders extend through valve plate 262.

A housing cover 294 is bolted by bolts 296 to the right-hand end of the casing 10'. Cover 294 includes a cored passage 298 which receives fluid pumped through each of the outlet ports in the plate 260. The cored passage 298 in turn communicates with an exhaust port shown in elevation at 300 in FIG. 5. A collector chamber for the fluid received through the inlet port is shown at 302. This chamber is defined by the casing 10 and the cylinder body 250 received therein. It communicates with each axial side of the cylinder body. Communication with the chamber 302 and the inlet ports in the valve plate 260 is established by cored passage 304 in the cover plate 292. Communication between the chamber 302 and the inlet ports in the valve plate 262 is defined by cored passage 306 formed in bearing plate 308. Plate 308 is formed with openings through which the piston rods extend, and it is formed also with a central bearing opening for the end bearing for shaft 104'. This is situated within the casing 10' and is located directly adjacent the left-hand surface of the valve plate 262.

Having thus described preferred embodiments of our invention, what we claim and desire to secure by U.S. Letters Patent is:

1. A compressor assembly for compressible fluids comprising a housing, a cylinder body located in one end of said housing, multiple cylinders in said cylinder body, each cylinder receiving a working piston, a driveshaft journalled in said housing, a drive pulley journalled on said housing, fluid pressure operated clutch means for connecting drivably one end of said driveshaft to said pulley, an inlet port and an outlet port formed in said cylinder body adjacent each axial end of each cylinder, valve reeds registering with each port whereby fluid is admitted to one side of said working piston as fluid is pumped by said piston through the outlet port at the opposite end of said cylinder, a piston rod extending axially from each piston in the direction of said driveshaft, a swash plate driving connection between said driveshaft and said piston rods comprising a swash plate fixed to said drive-shaft, an articulated crosshead surrounding said swash plate, said swash plate comprising multiple segments, each having a radially outwardly facing bearing surface and a pair of radially extending walls situated on opposite sides of the margin of said swash plate, one wall being connected to a separate one of said piston rods and a thrust bearing slidably engaging the surfaces of said swash plate and transmitting thrust forces through said crosshead to said piston rods in each axial direction upon rotation of said driveshaft, the radially outward components of the forces applied by said swash plate being transmitted through the respective bearing surfaces of said crosshead segments to the surrounding housing, the outlet ports for each working cylinder at each end thereof comprising a pair of valve openings extending radially through said cylinder body and the inlet ports thereof extending axially, each of the inlet ports being in fluid communication and each of the outlet ports being in fluid communication.

2. A compressor assembly for compressible fluids comprising a housing, a cylinder body located in one end of said housing, multiple cylinders in said cylinder body, each cylinder receiving a working piston, a driveshaft journalled in said housing, a drive pulley journalled on said housing, fluid pressure operated clutch means for connecting drivably one end of said driveshaft to said pulley, an inlet port and an outlet port formed in said cylinder body adjacent each axial end of each cylinder, valve reeds registering with each port whereby fluid is admitted to one side of said working piston as fluid is pumped by said piston through the outlet port at the opposite end of said cylinder, a piston rod extending axially from each piston in the direction of said driveshaft, a swash plate driving connection between said driveshaft and said piston rods comprising a swash plate fixed to said driveshaft, an articulated crosshead surrounding said swash plate, said swash plate comprising multiple segments, each having a radially outwardly facing bearing surface and a pair of radially extending walls situated on opposite sides of the margin of said swash plate, one wall being connected to a separate one of said piston rods and a thrust bearing slidably engaging the surfaces of said swash plate and transmitting thrust forces through said crosshead to said piston rods in each axial direction upon rotation of said driveshaft, the radially outward components of the forces applied by said swash plate being transmitted through the respective bearing surfaces of said crosshead segments to the surrounding housing, bearing means for journalling said driveshaft at spaced locations in said housing, lubrication oil passages located in part in said driveshaft and extending to said swash plate assembly and bearings for said driveshaft, conduit structure extending from the high pressure side of said pump to said bearing passages and to said clutch means, valve means situated in and partly defining a portion of said conduit structure extending to said clutch means whereby actuating pressure is distributed to and exhausted from said clutch means thereby effecting a selective connection between said drive pulley and said driveshaft, the outlet ports for each working cylinder at each end thereof comprising a pair of valve openings extending radially through said cylinder body and the inlet ports thereof extending axially, each of the inlet ports being in fluid communication and each of the outlet ports being in fluid communication.

* * * * *

UNITED STATES PATENT AND TRADEMARK OFFICE
CERTIFICATE OF CORRECTION

PATENT NO. : 3,817,660
DATED : June 18, 1974
INVENTOR(S) : John Knowles et al

It is certified that error appears in the above-identified patent and that said Letters Patent are hereby corrected as shown below:

Column 7, Claim 1, lines 15 and 16, change "swashplate"

to --crosshead--.

Column 8, Claim 2, lines 10 and 11, change "swashplate"

to --crosshead--.

Signed and Sealed this

Twenty-fourth Day of November 1981

[SEAL]

Attest:

GERALD J. MOSSINGHOFF

Attesting Officer     Commissioner of Patents and Trademarks